(12) United States Patent
Khatri et al.

(10) Patent No.: US 8,689,871 B2
(45) Date of Patent: Apr. 8, 2014

(54) COMPOSITIONS AND METHODS FOR WELL COMPLETIONS

(75) Inventors: Deepak Khatri, Houston, TX (US); Mitch Rice, Richmond, TX (US); Nikole Strickler, Denver, CO (US); Robert Williams, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 155 days.

(21) Appl. No.: 13/273,236

(22) Filed: Oct. 14, 2011

(65) Prior Publication Data

US 2012/0175118 A1     Jul. 12, 2012

Related U.S. Application Data

(60) Provisional application No. 61/410,994, filed on Nov. 8, 2010.

(51) Int. Cl.
*E21B 33/13*            (2006.01)
*E21B 43/295*          (2006.01)

(52) U.S. Cl.
USPC ............................... 166/293; 166/309

(58) Field of Classification Search
None
See application file for complete search history.

(56) References Cited

U.S. PATENT DOCUMENTS

| | | |
|---|---|---|
| 4,304,298 A | 12/1981 | Sutton |
| 4,328,038 A * | 5/1982 | Briggs .................... 106/642 |
| 4,340,427 A | 7/1982 | Sutton |
| 4,367,093 A | 1/1983 | Burkhalter et al. |
| 4,450,010 A | 5/1984 | Burkhalter et al. |
| 4,565,578 A | 1/1986 | Sutton et al. |
| 4,691,558 A | 9/1987 | Vinson et al. |
| 5,293,938 A | 3/1994 | Onan et al. |
| 5,996,693 A | 12/1999 | Heathman |
| 6,270,565 B1 | 8/2001 | Heathman |
| 6,715,553 B2 | 4/2004 | Reddy et al. |
| 6,722,434 B2 | 4/2004 | Reddy et al. |
| 6,858,566 B1 | 2/2005 | Reddy et al. |
| 6,992,048 B2 | 1/2006 | Reddy et al. |
| 7,073,584 B2 | 7/2006 | Reddy et al. |
| 7,156,175 B2 | 1/2007 | Reddy et al. |
| 7,334,638 B2 | 2/2008 | Santra et al. |
| 7,473,313 B2 | 1/2009 | Santra et al. |
| 7,642,223 B2 | 1/2010 | Santra et al. |
| 7,722,954 B2 | 5/2010 | Santra et al. |
| 7,792,250 B1 | 9/2010 | Iverson et al. |
| 7,878,270 B2 | 2/2011 | Lee et al. |
| 2004/0171499 A1 | 9/2004 | Ravi et al. |
| 2006/0283357 A1 | 12/2006 | Santra et al. |
| 2006/0283595 A1 | 12/2006 | Santra et al. |
| 2009/0071375 A1 | 3/2009 | Santra et al. |

FOREIGN PATENT DOCUMENTS

| | | |
|---|---|---|
| EP | 0124227 | 11/1984 |
| WO | 03/102107 | 12/2003 |
| WO | 03/102108 | 12/2003 |
| WO | 03/102361 | 12/2003 |
| WO | 2004/099557 | 11/2004 |
| WO | 2005/047212 | 5/2005 |
| WO | 2006/134355 | 12/2006 |

OTHER PUBLICATIONS

Nelson EB, Michaux M and Drochon B: "Cement Additives and Mechanisms of Action," in Nelson EB and Guillot D. (eds.): Well Cementing (2nd Edition), Schlumberger, Houston (2006) 49-91.
Stiles D: "Annular Formation Fluid Migration," in Nelson EB and Guillot D. (eds.): Well Cementing (2nd Edition), Schlumberger, Houston (2006) 289-317.

* cited by examiner

*Primary Examiner* — Zakiya W Bates
(74) *Attorney, Agent, or Firm* — Michael Dae

(57) ABSTRACT

Expansive cements for use in cementing subterranean wells contain an encapsulated gas-generating substance. The gas-generating substance comprises one or more materials that release hydrogen, nitrogen or both. The gas-generating substance is encapsulated by a coating comprising a polymer. The coating prevents premature gas release at the surface during slurry mixing, and promotes gas release at a desired location in the subterranean well. The released gas may also control the internal pore pressure of the cement slurry, thereby inhibiting the invasion of formation fluids into the borehole.

17 Claims, No Drawings

COMPOSITIONS AND METHODS FOR WELL COMPLETIONS

CROSS-REFERENCED APPLICATIONS

This application claims benefit of the provisional application 61/410,994 filed on Nov. 8, 2010 incorporated by reference in its entirety.

BACKGROUND

The statements in this section merely provide background information related to the present disclosure and may not constitute prior art.

This disclosure relates to compositions and methods for treating subterranean formations, in particular, compositions and methods for cementing subterranean wells.

During the construction of subterranean wells, it is common, during and after drilling, to place a tubular body in the wellbore. The tubular body may comprise drillpipe, casing, liner, coiled tubing or combinations thereof. The purpose of the tubular body is to act as a conduit through which desirable fluids from the well may travel and be collected. The tubular body is normally secured in the well by a cement sheath. The cement sheath provides mechanical support and hydraulic isolation between the zones or layers that the well penetrates. The latter function is important because it prevents hydraulic communication between zones that may result in contamination. For example, the cement sheath blocks fluids from oil or gas zones from entering the water table and polluting drinking water. In addition, to optimize a well's production efficiency, it may be desirable to isolate, for example, a gas-producing zone from an oil-producing zone. The cement sheath achieves hydraulic isolation because of its low permeability. In addition, intimate bonding between the cement sheath and both the tubular body and borehole is necessary to prevent leaks.

Poor cement-sheath bonding may have several negative consequences. Interzonal hydraulic communication may interfere with proper well production, allow formation fluids to corrode the casing, and result in an environmental incident should hydrocarbons or saline fluids commingle with aquifers. The effectiveness of stimulation treatments may also be hampered, further limiting well production. Frequently, poor bonding is manifested by the presence of gaps, or "microannuli," along the cement/casing interface, the cement/formation interface or both.

Cement systems that expand slightly (preferably less than about 1% linear expansion) after setting are a proven means for sealing microannuli and improving primary cementing results. The improved bonding is thought to be the result of mechanical resistance or tightening of the cement against the pipe and formation.

Some expansive cement systems rely upon the formation of the mineral ettringite to induce expansion. Ettringite is a calcium sulfoaluminate mineral that forms when the aluminate phases in Portland cement react with various forms of added calcium sulfate (usually calcium sulfate hemihydrate). Ettringite crystals have a larger bulk volume than the reactants from which they form; consequently, expansion occurs because of the internal pressure exerted upon crystallization. A limitation of ettringite-based systems is their inability to provide significant expansion at curing temperatures above about 76° C. (170° F.). Ettringite is not stable at higher temperatures and converts to another sulfoaluminate mineral that does not impart expansion.

Another type of expanding cements involves cement slurries containing high concentrations of NaCl, $Na_2SO_4$, or both. After the cement sets, cement expansion occurs because of internal pressure exerted by the crystallization of the salts within pores, and by chlorosilicate and chlorosulfoaluminate reactions. These systems may be effective at temperatures up to 204° C. (400° F.). However, the high cement-slurry salinity may cause casing corrosion, and may interfere with the performance of other cement additives—fluid-loss additives in particular.

Addition of calcined calcium oxide or magnesium oxide also may result in cement expansion after setting. The oxide hydration results in the formation of a hydroxide that is less dense than the reactants, thereby providing an expansive force within the cement matrix. These oxide systems have been employed successfully at temperatures up to about 260° C. (500° F.); however, the rate at which they react, and hence the expansion generated, may be difficult to control. If the additive hydrates too quickly (e.g., before the cement sets), little or no cement expansion may occur. If the additives hydrate too slowly, the expansion may occur too late and allow interzonal communication.

A more complete discussion of current expansive cement systems may be found in the following publication. Nelson E B, Drochon B, Michaux M and Griffin T J: "Special Cement Systems," in Nelson E B and Guillot D. (eds.): *Well Cementing* ($2^{nd}$ Edition), Schlumberger, Houston (2006) 233-268.

Gas-generating agents may also be used to prepare expansive cements. When immersed in the high-pH aqueous environment, such as a Portland-cement slurry, the agents react and produce gas bubbles. For example, metals such as aluminum react in the presence of an aqueous, high-pH environment, resulting in the liberation of hydrogen gas. Without wishing to be bound by any theory, the pressurization effect is thought to cause the slurry to expand against the boundaries into which it has been injected—for example, the annular region between the casing string and the borehole wall. Such expansion may improve bonding at the casing/cement and casing/borehole-wall interfaces.

Gas-generating agents also have utility for preventing annular-fluid migration. In this context, cements containing gas-generating agents are commonly referred to as "compressible cements." Without wishing to be bound by any theory, such cements are thought to maintain the cement-pore pressure above the formation-pore pressure, thereby preventing ingress of gas or other formation fluids into the cemented annulus. A more complete discussion of gas-generating agents for preventing annular-fluid migration may be found in the following publication. Stiles D: "Annular Formation Fluid Migration," in Nelson E B and Guillot D. (eds.): *Well Cementing* ($2^{nd}$ Edition), Schlumberger, Houston (2006) 289-317.

One difficulty with many gas-generating agents is their high reactivity when exposed to water. In the context of well cementing, the optimal period for gas generation is between the time at which the cement slurry enters the annulus and the time at which the slurry sets and begins developing strength. Premature gas generation may result in the release of gas at the surface, thereby reducing the ultimate slurry compressibility, and possibly presenting a safety hazard. Gas generation after the slurry sets may also reduce the ultimate slurry because of mechanical resistance exerted by the strengthening cement matrix.

Despite the valuable contributions of the prior art, it would be advantageous to delay the reactions between gas-generating agents and water, and maximize their intended expansion and pressurization effects.

SUMMARY

Embodiments allow improvements by providing gas-generating cement additives that release gas at the optimal time in a subterranean well. In an aspect, embodiments relate to a method for cementing a subterranean well. In a further aspect, embodiments relate to a method for controlling the liberation of gas from a gas-generating agent. In yet a further aspect, embodiments relate to a method for controlling the internal pore pressure of a well-cementing composition.

DETAILED DESCRIPTION

At the outset, it should be noted that in the development of any such actual embodiment, numerous implementations—specific decisions must be made to achieve the developer's specific goals, such as compliance with system-related and business-related constraints, which will vary from one implementation to another. Moreover, it will be appreciated that such a development effort might be complex and time consuming, but would nevertheless be a routine undertaking for those of ordinary skill in the art having the benefit of this disclosure. In addition, the composition used/disclosed herein may also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific points, it is to be understood that the inventors appreciate and understand that any and all data points within the range are to be considered to have been specified, and that the inventors possessed knowledge of the entire range and all points within the range.

As stated earlier, in the context of well cementing, means to control the behavior of gas-generating agents is of paramount importance. The reactions that produce gas should preferably not occur during the mixing of the cement slurry at the surface. Instead, the gas release should preferably begin after the cement slurry has entered the subterranean well, and even more preferably after the cement slurry has arrived at its final destination. During primary cementing, the final destination might be the annular region between the casing and the borehole wall, or the annular region between the casing and another casing string. During remedial cementing, the final destination might be inside formation cracks or perforations, or at a location inside the borehole (e.g., a cement plug). It is equally important that the gas release should preferably occur before the cement slurry has set and begun to develop strength; otherwise, the expansion effect would likely be lessened.

The inventors discovered that polymer coatings, styrene-butadiene polymer latex in particular, are effective encapsulants. In addition, they found that the latex coating slowly degraded when the encapsulated particles were immersed in a Portland-cement slurry, and ultimately allowed the gas generating metal to contact the water in the slurry and react to generate hydrogen gas.

Therefore, in an aspect, embodiments relate to a method for cementing a subterranean well. A well-cementing composition or slurry is prepared that comprises water, an inorganic cement and particles comprising a gas-generating substance. The gas-generating substance comprises one or more materials that release a gas such as hydrogen, nitrogen or both. The gas-generating material is encapsulated by a coating comprising a polymer. The composition may be pumpable, with a viscosity that is preferably below 1000 mPa-s at a shear rate of 100 $s^{-1}$. After preparation, the slurry is placed in the subterranean well. Those skilled in the art will recognize that the method may involve primary cementing or remedial cementing.

Preferably, coating degradation and gas liberation are delayed for a period of at least 2 minutes after slurry preparation. This may prevent premature gas liberation at the surface, and promote gas liberation near or at the slurry's final destination. The gas liberation may pressurize the slurry, maintaining an internal pore pressure higher than that of the formation fluids, and also causing volumetric slurry expansion. Gas liberation preferably occurs before the cement begins to set and develop strength.

In a further aspect, embodiments relate to a method for controlling the liberation of gas from a gas-generating agent. Particles comprising a gas-generating substance are provided, and the particle surfaces are coated and encapsulated by a material comprising a polymer. The gas-generating substance comprises one or more materials that release hydrogen, nitrogen or both. The polymer coating may protect the particles from humidity during storage, and may prevent the gas-generating material from reacting instantaneously when exposed to water in the cement slurry.

In yet a further aspect, embodiments relate to a method for controlling the internal pore pressure of a well-cementing composition in a subterranean well. A well-cementing composition or slurry is prepared that comprises water, an inorganic cement and particles comprising a gas-generating substance. The gas-generating substance comprises one or more materials that release hydrogen, nitrogen or both. The particles are encapsulated by material comprising a polymer. After preparation, the slurry is placed in the subterranean well. The coating is allowed to degrade, thereby exposing the gas-generating substance to water. The reaction with water causes the liberation of gas, thereby pressurizing the well-cementing composition.

Preferably, coating degradation and gas liberation are delayed for a period longer than at least 2 minutes after slurry preparation. This may prevent premature gas liberation at the surface, and promote gas liberation near or at the slurry's final destination. The gas liberation may pressurize the slurry, maintaining an internal pore pressure higher than that of the formation fluids, and also causing slurry expansion. Gas liberation preferably occurs before the cement begins to set and develop strength.

For all embodiments, the gas-generating substance may release hydrogen, nitrogen or both. Gas-generating agents that release hydrogen may comprise (but not be limited to) aluminum, calcium, zinc, iron, magnesium, lithium, sodium and potassium. Gas-generating agents that release nitrogen may comprise (but not be limited to) azodicarbonamide, sodium azodicarboxylate, azobismethyl propionitrite and p-toluenesulfonhydrazide. Of these, aluminum is preferred.

The inorganic cement may be chosen from (but would not be limited to) one or more members of the following list: Portland cement, calcium aluminate cement, lime-silica blends, geopolymers, Sorel cements, chemically bonded phosphate ceramics, zeolites and cement-kiln dust. Of these, Portland cement is preferred. The cements may further comprise extenders such as (but not limited to) fly ash, blast-furnace slag, silica, silica fume, nanosilica and nanoalumina.

The coating may comprise one or more members of the list comprising styrene-butadiene copolymer latexes, acrylic resins, styrene/acrylic copolymer resins, acrylic ester resins, methylcellulose, ethylcellulose, hydroxypropylcellulose, and polyvinylidene chloride. Of these, styrene-butadiene latexes are preferred. The molecular weight of the styrene-butadiene polymer is preferably between about $1.0 \cdot 10^5$ g/mol and about $5.0 \cdot 10^5$ g/mol, and more preferably between about $1.5 \cdot 10^5$ g/mol and about $4.0 \cdot 10^5$ g/mol.

The coating is preferably present at a concentration up to about 20% by weight of gas-generating material, and more preferably at a concentration between about 5% and about 15% by weight of gas-generating material.

The particle size of the coated gas-generating additive is preferably between about 2 μm and 2000 μm, more preferably between about 100 μm and 1000 μm, and most preferably between about 290 μm and about 850 μm.

In addition to the gas-generating particles, the cement slurries may also comprise customary additives such as (but not limited to) retarders, accelerators, extenders, fluid-loss-control additives, lost-circulation additives, gas-migration additives and antifoam agents. Furthermore, the cement slurries may contain additives that enhance the flexibility and/or toughness of the set cement. Such additives include (but are not limited to) flexible particles having a Young's modulus below about 5000 MPa and a Poisson's ratio above about 0.3. Preferably, such particles would have a Young's modulus below about 2000 MPa. Examples include (but are not limited to) polyethylene, acrylonitrile butadiene, styrene butadiene, polyamide, polytetrafluoroethylene, polyether ether ketone, perfluoroalkoxy polymer resin, fluorinated ethylenepropylene, polyethylenetetrafluoroethylene, polyvinylfluoride, polychlorotrifluororethylene, perfluoroelastomers, fluorocarbon elastomers and combinations thereof. Such additives may also include fibers selected from the list comprising polyamide, polyethylene and polyvinyl alcohol. Metallic microribbons may also be included.

Those skilled in the art will appreciate that the disclosed method and use may not necessarily be applied throughout the entire length of the subterranean interval being cemented. In such cases, more than one cement-slurry composition is placed sequentially. The first slurry is called the "lead," and the last slurry is called the "tail." Under these circumstances, it is preferred that the inventive slurry be placed such that it resides in regions where hydrocarbons exist. In most cases, this will be at or near the bottom of the well; therefore, the inventive method and use would preferably apply to the tail. Those skilled in the art will also appreciate that the disclosed embodiments would not only be useful for primary cementing, but also for remedial cementing operations such as squeeze cementing and plug cementing.

Other and further objects, features and advantages of the present disclosure will be readily apparent to those skilled in the art upon a reading of the description of the examples which follow.

EXAMPLES

The following examples serve to further illustrate the disclosure.

For the following examples, a base slurry was prepared with the following composition: Class H cement, 15% silica sand by weight of cement (BWOC), 20% silica flour BWOC, 6% sodium chloride BWOC, 4.5 L/kg of cement silicone antifoam agent, 4.5 L/kg sodium alklyether sulfate, 71.2 L/kg styrene-butadiene latex, 17.8 L/kg AMPS/acrylamide copolymer solution (10.7% active), 21.4 L/kg sodium lignosulfonate solution (40% active) and sufficient water to achieve a slurry density of 2.06 kg/m³ (17.2 lbm/gal).

Aluminum particles, encapsulated by styrene-butadiene polymer latex, were added to the base slurry in three concentrations: 0.5% BWOC, 1.0% BWOC and 2.0% BWOC. The particles were "Coated Aluminum Granules," (CAG) available from Fritz Industries, Inc., Mesquite, Tex., USA.

The slurry mixing procedure conformed to the recommended practice documented in ISO Publication 10426-2.

Example 1

The behavior of the slurries described above was observed at ambient temperature and pressure. After preparation, a 100-mL sample of each slurry was placed in a 250-mL graduated cylinder. Gas generation was visually detected at about 40 minutes after mixing, and bubbles in the slurries became noticeable after 60-70 minutes. The bubbles moved upward through the slurry columns. The duration of the reaction was between 2.5-3.0 hours after mixing.

After the reactions ceased, the cement-slurry volumes were measured and compared with the initial volumes. The slurry containing 0.5% CAG BWOC expanded about 8% by volume. The 1.0% CAG slurry expanded about 15% by volume and the 2.0% CAG slurry expanded about 20% by volume.

Example 2

The behavior of the slurries described above was observed under simulated downhole conditions. Slurry samples were placed in expansion rings, and slurry expansion was measured according to the standard procedure described in ISO Publication 10426-2. The temperature in the curing vessel was increased from 27° C. to 99° C. during a 2-hr period. After curing for 24 hr, the expansion rings were removed and the radial expansion was measured. Replicate tests were performed to verify the consistency of the results. The radial expansion of the slurry containing 0.5% CAG BWOC varied between 0.5% and 0.8%. The radial expansion of the slurry containing 1.0% CAG BWOC varied between 1% and 2%. The radial expansion of the slurry containing 2.0% CAG BWOC varied between 1.5% and 2.75%.

The invention claimed is:

1. A method for cementing a subterranean well, comprising:
   (i) preparing a well-cementing composition comprising water, an inorganic cement and an additive comprising particles comprising a gas-generating substance that is encapsulated by coating comprising a polymer, wherein the gas-generating substance comprises one or more materials that release hydrogen, nitrogen or both; and
   (ii) placing the composition in the well,
   wherein the additive particle size is between about 2 μm and 2000 μm.

2. The method of claim 1, wherein the gas-generating materials that release hydrogen comprise one or more members of the list comprising aluminum, calcium, zinc, iron, magnesium, lithium, sodium and potassium.

3. The method of claim 1, wherein the gas-generating materials that release nitrogen comprise one or more members of the list comprising azodicarbonamide, sodium azodicarboxylate, azobismethyl propionitrite and p-toluenesulfonhydrazide.

4. The method of claim 1, wherein the coating comprises one or more members selected from the group consisting of styrene-butadiene copolymer latexes, acrylic resins, styrene/ acrylic copolymer resins, acrylic ester resins, methylcellulose, ethylcellulose, hydroxypropylcellulose, and polyvinylidene chloride.

5. The method of claim 4, wherein the molecular weight of the styrene-butadiene copolymer is between about $1.5 \cdot 10^5$ g/mol and about $4.0 \cdot 10^5$ g/mol.

6. The method of claim 1, wherein the coating is present at a concentration up to about 20% by weight of gas-generating material.

7. A method for controlling the liberation of gas from a gas-generating agent, comprising:
 (i) providing particles comprising a gas-generating substance, wherein the gas-generating substance comprises one or more materials that release hydrogen, nitrogen or both; and
 (ii) coating the particle surfaces with a material comprising a polymer, thereby encapsulating the particles,
 wherein the additive particle size is between about 2 μm and 2000 μm.

8. The method of claim 7, wherein the gas-generating material releases hydrogen, and comprises one or more members of the list comprising aluminum, calcium, zinc, iron, magnesium, lithium, sodium and potassium.

9. The method of claim 7, wherein the gas-generating material releases nitrogen, and comprises one or more members of the list comprising azodicarbonamide, sodium azodicarboxylate, azobismethyl propionitrite and p-toluenesulfonhydrazide.

10. The method of claim 7, wherein the coating comprises one or more members selected from the group consisting of styrene-butadiene copolymer latexes, acrylic resins, styrene/acrylic copolymer resins, acrylic ester resins, methylcellulose, ethylcellulose, hydroxypropylcellulose, and polyvinylidene chloride.

11. The method of claim 10, wherein the molecular weight of the styrene-butadiene copolymer is between about $1.5 \cdot 10^5$ g/mol and about $4.0 \cdot 10^5$ g/mol.

12. The method of claim 7, wherein the coating is present at a concentration up to about 20% by weight of gas-generating material.

13. A method for controlling the internal pore pressure of a well-cementing composition in a subterranean well, comprising:
 (i) preparing a well-cementing composition comprising water, an inorganic cement and an additive comprising particles comprising a gas-generating substance that is encapsulated by a coating comprising a polymer, wherein the gas-generating substance comprises one or more materials that release hydrogen, nitrogen or both;
 (ii) placing the composition in the well; and
 (iii) allowing the coating to degrade, thereby exposing the gas-generating material to water, thereby causing the liberation of gas, thereby pressurizing the well-cementing composition,
 wherein the additive particle size is between about 2 μm and 2000 μm.

14. The method of claim 13, wherein the gas-generating material releases hydrogen, and comprises one or more members of the list comprising aluminum, calcium, zinc, iron, magnesium, lithium, sodium and potassium.

15. The method of claim 13, wherein the gas-generating material releases nitrogen, and comprises one or more members of the list comprising azodicarbonamide, sodium azodicarboxylate, azobismethyl propionitrite and p-toluenesulfonhydrazide.

16. The method of claim 13, wherein the coating comprises one or more members selected from the group consisting of styrene-butadiene copolymer latexes, acrylic resins, styrene/acrylic copolymer resins, acrylic ester resins, methylcellulose, ethylcellulose, hydroxypropylcellulose, and polyvinylidene chloride.

17. The method of claim 13, wherein the coating is present at a concentration up to about 20% by weight of gas-generating material.

* * * * *